Jan. 20, 1959   H. J. RIBLET   2,870,419
ULTRA-HIGH FREQUENCY DIRECTIONAL COUPLING APPARATUS
Filed June 12, 1953.   2 Sheets-Sheet 1

INVENTOR
Henry J. Riblet
By [signature]
his Attorney

United States Patent Office 2,870,419
Patented Jan. 20, 1959

2,870,419

ULTRA-HIGH FREQUENCY DIRECTIONAL COUPLING APPARATUS

Henry J. Riblet, Wellesley, Mass.

Application June 12, 1953, Serial No. 361,169

6 Claims. (Cl. 333—10)

The present invention relates to electromagnetic energy couplers between ultra-high-frequency transmission lines, such as waveguides, dielectric guides, coaxial lines, or the like, and in particular relates to directional couplers between two such ultra-high-frequency waveguide transmission lines.

In order to connect measuring apparatus to an ultra-high-frequency energy transmission system, some means of radio frequency energy coupling must be provided. Such coupling means should preferably operate independently of the standing waves which may exist in the transmission line, and the amount of power which is extracted from the transmission line should preferably be a definite fraction of the power which is to be transmitted along the main transmission line. To obtain these advantageous conditions, it is highly desirable that the coupler operate in such a manner that an electromagnetic wave travelling in a single direction along the main line induces a wave travelling in a single direction along the coupling line. Likewise, a wave travelling in the opposite direction in the main line should induce a wave travelling in the opposite direction in the coupling line. A coupler which has these properties is known as a "directional coupler."

The performance of a directional coupler may be described in terms of two quantities:

(1) *Coupling.*—The coupling of a directional coupler is the strength of the wave travelling in the main guide relative to the strength of the travelling wave which it induces in the auxiliary waveguide. This is a power ratio, usually expressed in decibels.

(2) *Directivity.*—Only in the ideal directional coupler does a single wave travelling in the main guide induce a wave travelling in a single direction in the auxiliary guide. In a practical coupler, two waves travelling in opposite directions are induced in the auxiliary line. The induced waves are normally greatly unequal in strength. The difference between the weak signal called the directive signal and the larger signal called the coupled signal is the directivity of the coupler, also expressed in decibels.

Two such known directional couplers employ rectangular waveguides juxtaposed so that their axes are at right angles, and their wide-dimension sides are in contact. Then the engaging surfaces of the waveguides form a square. In Patent No. 2,473,273 issued to Wm. E. Bradley, the required directivity is achieved by providing a pair of coupling slots perpendicular to and bisecting each other in the common square face of each of said waveguides, the intersections of the slots being along one diagonal of the square. In the other Patent No. 2,602,859 issued to T. Moreno, the required directivity is achieved by placing identical slots in diagonally opposite quadrants of the common square wall section on one of the diagonals of the square and equidistant from the center of the square.

It is well known to the art that the coupling characteristics of an aperture between two waveguides depends on its electric polarizability P as well as on its two magnetic polarizabilities $M_1$ and $M_2$. The two inventors referred to have limited themselves to apertures which minimize P and have assumed $P=0$ in the discussions of their inventions. I have discovered, however, that the principal reason for the rather poor directivity achieved with previous directional couplers of this type in the past is due to the fact that $P \neq 0$.

The operation of my invention depends on the fact that the voltage due to the electric coupling through an aperture in the common wall between two perpendicular waveguides differs by 90° from that due to the axial and transverse magnetic fields. Thus small apertures which are sensitive only to the magnetic field may be suitably placed a quarter of a waveguide length away from the principal aperture to cancel out the undesired voltage due to the electric polarizability.

Thus the principal object of my invention is to provide crossed guide directional couplers having higher directivities over wider frequency bands than previously obtainable.

It is a further object of my invention to provide crossed guide directional couplers having more constant power transfer properties, as a function of frequency, than previously obtainable. This possibility arises from the fact that the premium on small electric polarizability in the principal coupling aperture is removed by my invention. Thus round holes and other low Q apertures may be used in place of the high frequency selective slot configurations previously employed in crossed guide directional couplers.

A further object of my invention is to provide a crossed guide directional coupler that is not critical in design and is economical to fabricate.

These and other objects of my invention will now become apparent from the following specifications taken in conjunction with the accompanying drawings in which.

Figure 1:
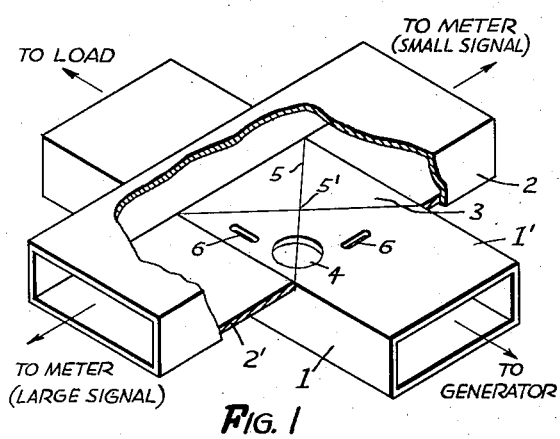
Figure 1 is a broken perspective view of two mutually perpendicular coupled rectangular waveguides.

Referring now to Figure 1, there is shown a pair of mutually perpendicular waveguides 1 and 2. Waveguide 1 which is connected to the signal generator will be referred to as the main waveguide, while waveguide 2 to which is connected the indicating meter will be referred to as the auxiliary waveguide. The waveguides 1 and 2 are of substantially similar construction and may be positioned so that the upper wall 1' of the waveguide 1 contacts the lower wall of 2' of the waveguide 2 over a substantially square area 3. In a preferred construction, the square portion 3 of the lower wall 2' of the upper waveguide 2 can be removed to engage the lower waveguide 1.

As illustrated in Figure 1 the upper wall 1' of the waveguide 1 is provided with a principal coupling aperture 4 consisting of a round hole located on one of the principal diagonals 5 of the square portion 3 of the lower waveguide 1. In general this aperture will lie mainly on one side of the center 5' of said square 3 so that it is excited by the transverse and longitudinal components of the magnetic field in the main waveguide 1 as well as by the electric field in waveguide 1. Subsidiary smaller coupling apertures 6 are also provided in the square section 3 of the upper wall 1' of waveguide 1 which is also common to waveguide 2. These subsidiary apertures 6 are displaced from the diagonal containing the principal coupling aperture 4 in directions parallel to the axis of waveguides 1 and 2 by one quarter of the guide wavelength at some operating frequency of the crossed guide directional coupler and are symmetrically located about this diagonal. These subsidiary coupling apertures are either so shaped or so located that they couple to but one component of the magnetic field in the main waveguide 1 while their coupling to the electric field is much smaller.

Figure 2:
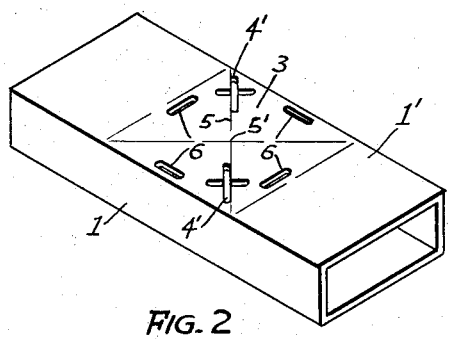
Figure 2 shows a possible configuration of coupling apertures placed in one of the waveguides.

Figure 2 illustrates how the principal coupling aperture 4 may be replaced by a pair of principal coupling apertures 4' which fall on one of the diagonals of the common square 3, although on opposite sides of its center 5'.

Figure 3:
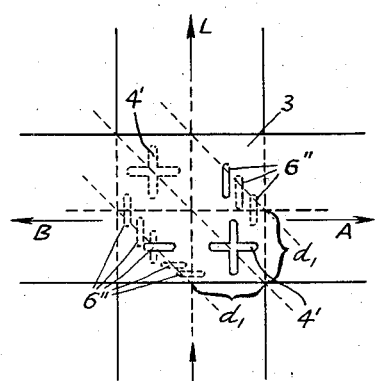
Figures 3, 4 and 5 show in schematic form other possible configurations of coupling apertures.

Figure 3 illustrates how the subsidiary coupling apertures need not be symmetrically located about the diagonal of the common square 3 containing the principal coupling apertures 4'. Moreover this figure illustrates that a plurality of subsidiary coupling apertures 6'' may be used which need not fall on a pair of lines parallel to the diagonal containing the principal coupling aperture 4'. The distance $d_1$ will be in general one quarter of the guide wavelength at some operating frequency of the device.

Figure 4:
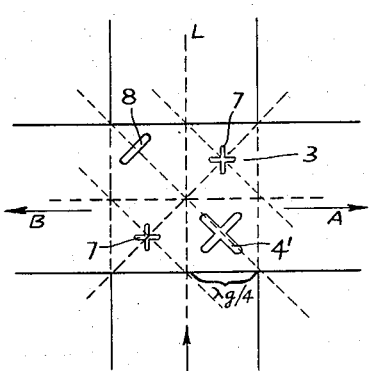

In Figure 4, it is shown that the subsidiary coupling apertures 7 may be smaller cross slots and thus, as is well known to the art, secondary directional couplers. Here is illustrated how the principal coupling apertures 4' and 8 need not be alike nor symmetrically located about the center of the common square 3.

Figure 5:
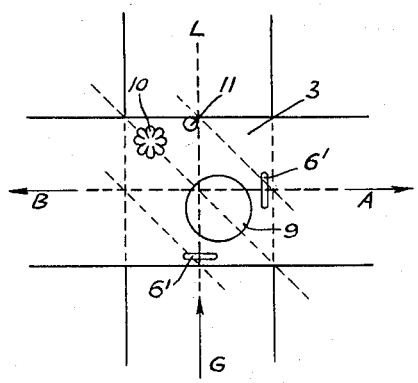

Figure 5 shows some additional variations which are possible in the shape and locations of the principal coupling apertures 9 and 10 and in the shape and location of the subsidiary coupling apertures 6' and 11.

Figure 6:
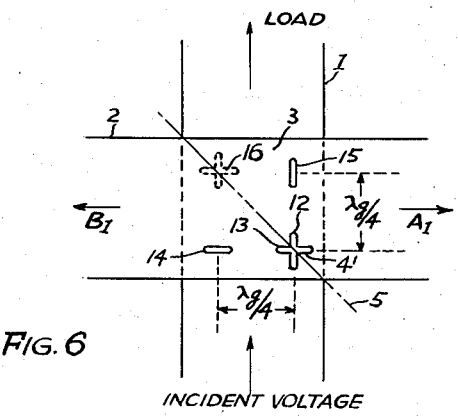
Figures 6–12 are schematic drawings which will be used in explaining the operation of my invention.

Referring now to Figure 6, it has been shown by Bradley in a previously cited patent and by Surdin, "Directional Couplers in Waveguides" Jour. I. E. E. London, pt. III, A931 (No. 4) 1946, pp. 728 that, if a cross slot coupling aperture 4' is cut in the square common wall 3 between two rectangular waveguides 1 and 2 at right angles to each other as shown in this figure, some of the incident voltage will be transferred from the main guide 1 to the auxiliary guide 2 where for sufficiently small slots all of the energy will proceed in the direction of $A_1$ previously called the coupling direction. Riblet, "A swept frequency 3-centimeter impedance indicator" Proc. I. R. E. vol. 36, No. 12, December 1948, pp. 1499 has further shown that, even for finite slots, that $B_1$, which will be referred to as the directive voltage, will be zero for all frequencies on the assumption of perfect symmetry so long as there is no electric coupling through the aperture. The failure of the cross slot aperture to achieve the theoretically perfect directivity can thus be attributed to the non vanishing of the electric polarizability of the cross slot. My invention consists in the provision of suitable subsidiary apertures to provide voltages in amplitude and phase to cancel out the undesired voltage in the direction of $B_1$. The understanding of how this is accomplished will be facilitated by two formulas given by Surdin $$A_1 = \frac{\gamma}{ab}(M_L H_m H_a + M_T H_m H_a - jP E_m E_a)$$

$$B_1 = \frac{\gamma}{ab}(-M_L H_m H_a + M_T H_m H_a - jP E_m E_a)$$

where $M_L$, $M_T$ and P are slowly varying functions of the frequency and the H's and the E's are positive real numbers which depend on the magnetic and electric fields existing in the main and auxiliary waveguides at the point where the aperture is cut. Our interest centers in $B_1$ which is the undesired voltage. $M_L$ is the magnetic polarizability of the slot 12 which is longitudinal to the main guide 1. $M_T$ is the magnetic polarizability of the slot 13 which is transverse to the main guide 1 while P is the electric polarizability of the cross slot 4'. It is clear from Surdin's formula for $B_1$, that the voltage contributed by the electric polarizability lags that due to the magnetic polarizability, $M_T$, of the transverse slot 13 by 90° while it leads by 90° the voltage due to the magnetic polarizability $M_L$ of the longitudinal slot 12.

It is clear then how a transverse slot 14 placed in the same transverse plane as the crossed slot, but displaced toward the direction of $B_1$, i. e. toward the directive arm by one quarter of a guide wavelength will give rise to a voltage in the auxiliary guide 2 travelling in the directive arm having the proper phase to cancel out the voltage in this direction due to the electric polarizability P of the crossed slot 4'. A similar remark may be applied to a longitudinal slot 15 cut in the common square wall 3 in the same longitudinal plane as the crossed slot 4' although displaced from it toward the load by one quarter of a guide wavelength. It is also clear how similar remarks would apply to a cross slot placed in the position shown by the dotted lines 16. Now however the transverse slot 13 would be replaced by a longitudinal slot, while the longitudinal slot 15 would be replaced by a transverse slot.

Figure 8:
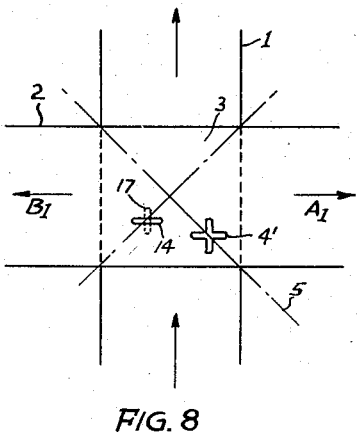
Figure 7:
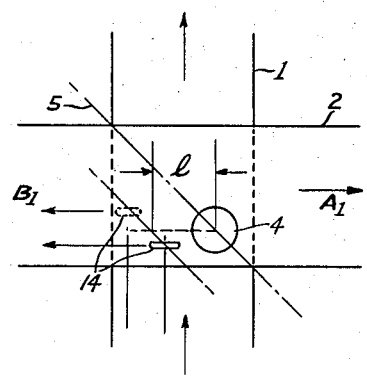

Figure 7 indicates how the phase of the voltage toward the directive arm due to a transverse slot is not affected by translating it along a line parallel to the principal diagonal 5 of the square 3 on which the principal coupling aperture 4 is placed. Now suppose that the transverse slot 14 has been displaced until its center falls on the other principal diagonal of the common square 3 as shown in Figure 8. Now it is well known to the art that a longitudinal slot 17 cut at center of the transverse slot 14 will excite a voltage travelling toward $B_1$ having the same phase as the voltage excited by the transverse slot. This follows from the fact that together they constitute a crossed slot directional coupler in which the major portion of the energy which they couple from the main guide 1 to the auxiliary guide 2 travels in the direction of $B_1$. Thus it is clear that either transverse or longitudinal slots may be used anywhere on the line displaced one quarter wavelength from the principal diagonal containing the principal coupling aperture 4' to cancel out the voltage in the directive arm arising from the electric polarizability of the principal coupling aperture 4. It is clear then that more general subsidiary apertures such as round holes may be used so long as they are smaller than the principal coupling aperture and suitably spaced from it.

Figure 9:
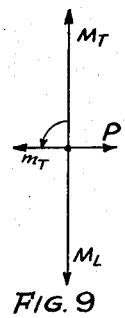
Figure 10:
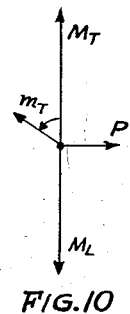

Figure 9 shows the relative sizes and phases of the voltages from the principal and subsidiary coupling apertures 4 and 14 in Figure 7 which proceed in the direction $B_1$. The voltage P is due to the electric polarizability of the principal coupling aperture 4. It lags by 90° the larger voltage due to the transverse magnetic polarizability of the principal coupling aperture 4 and leads by 90° that due to the longitudinal magnetic polarizability of the principal coupling aperture 4. Due to its transverse spacing from the principal coupling aperture, the subsidiary coupling aperture gives rise to a voltage $m_T$ resulting from its transverse magnetic polarizability which leads $M_T$ by 90° and thus has the proper phase to interfere destructively with P. Since the displacement $l$ can be a quarter of a guide wavelength at only one frequency, in general the relative phase of $m_T$ and P will vary as a function of frequency as shown in Figure 10.

It should be pointed out that the discussion above in terms of 90° and quarter guide wavelengths will be precisely true only in the limit of small coupling apertures. For finite slots departures from these idealized phase values must be expected so that optimum spacings must be determined experimentally.

Figure 11:
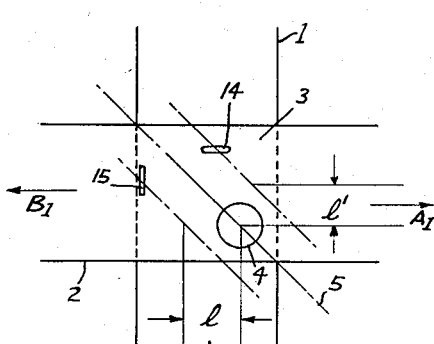
Figure 12:
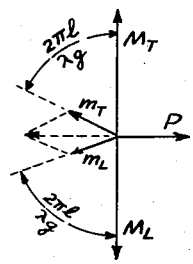

For broad band applications, the arrangement shown in Figure 11 has some advantages. Here two subsidiary coupling apertures 14 and 15 are placed on lines which are symmetrically located about the principal diagonal 5 of the common square 3 which contains the principal coupling aperture 4. Thus $l$ is equal $l'$. Figure 12 shows the phases and possible amplitudes of the voltages travelling toward $B_1$. The two subsidiary coupling apertures 14 and 15 give rise to voltages $m_L$ and $m_T$. At a frequency for which $l = \lambda_g/4$, $m_L$ and $m_T$ will be in phase and opposite to P. At a lower frequency where $\lambda_g$ is larger, the phase relationship shown in Figure 12 will occur where $m_T$ the voltage due to the longitudinal slot 15 no longer leads $M_T$ by 90° and where $m_L$ the voltage due to the transverse slot 14 no longer lags $M_L$ by 90°. It will be observed that the resultant voltage of $m_L$ and $m_T$ is still out of phase with P.

It will be apparent to one skilled in the art that voltage P can be cancelled out over wide bands of frequency in the following manner. The voltages $m_L$ and $m_T$ are inherently increasing functions of frequency. Thus by choosing $l$ to be a quarter of a guide wavelength at the low frequency portion of the operating band of the crossed guide directional coupler, the increase in the lengths of the vectors $m_L$ and $m_T$ made to compensate for the change in their relative phase so that their resultant is substantially constant in phase and magnitude.

Of course P is also a function of frequency. Moreover $M_T$ and $M_L$ need not be exactly the same size. It will be apparent to one familiar with the art however, how one, knowing the directive voltage established by the principal coupling aperture may select subsidiary coupling apertures which may be combined in accordance with the discussion of this specification, so as to establish an interfering voltage in the direction of $B_1$ which will yield very high directivity for the directional coupler over wide bands of frequency.

For example, I have constructed a crossed guide directional coupler as shown in Figure 1 using 1" x ½" waveguide in which the principal coupling aperture was a round hole .287" in diameter cut in the common wall .025" thick, .227" from the sides of the common square, and the subsidiary coupling apertures were four slots .140" x .062" cut adjacent to the walls of the waveguides and centered on the center lines of the waveguides. Over the band from 8.2 kmc. to 12.4 kmc. the coupling of the directional coupler was 31.5 db within a tolerance of ±.5 db, while the directivity of the crossed guide directional coupler was in excess of 27 db.

In a further example, using 1" x ½" waveguide in which the principal coupling aperture was a round hole .387" in diameter cut in the common wall .025" thick, .250" from the sides of the common square, the subsidiary coupling apertures were two slots .250" x .062" cut adjacent to the walls of the waveguides opposite the round hole and centered on the center lines of the waveguides. Over the band from 8.2 kmc. to 12.4 kmc. the coupling of the directional coupler was 21 db within a tolerance of ±.5 db, while the directivity of the crossed guide directional coupler was in excess of 23 db.

I have found in using round holes for the principal coupling aperture, that the energy coupled by the subsidiary apertures in the directivity direction is between 9 and 15 db below that coupled by the principal aperture in the coupling direction. This factor then determines the ratio of the coupling to be provided by the subsidiary apertures to the coupling provided by the round hole.

In another example, using 1" x ½" waveguide, the principal coupling apertures were crossed slots consisting of slots .410" x .062" placed on opposite ends of a principal diagonal of the common square with the centers of the slots .227 from the walls of the waveguides, and subsidiary coupling apertures were four slots .125 x .062 cut adjacent to the walls of the waveguides and centered on the center lines of the waveguides. Over the band from 8.5 kmc. to 9.6 kmc. the signal from the generator exceeded the signal to the meter by 20 db within a tolerance of ±.1 db, while the directivity was in excess of 40 db.

Various modifications in my invention will be apparent to one skilled in the art. For example the waveguides need not be alike nor rectangular, and they need not cross at right angles. I therefore prefer not to be bound by the specific disclosures hereinafter set forth, but only by the appended claims.

I claim:

1. Directional coupling apparatus comprising first and second perpendicularly oriented rectangular waveguides having a common broad wall of substantially square configuration, means to couple to said first waveguide longitudinal and transverse magnetic field components together with but to a lesser extent an electric field component of energy transmitted in said second waveguide, said means comprising a principal coupling aperture interconnecting said waveguides through said common wall and disposed toward an end of a diagonal of said square, and subsidiary means to couple primarily magnetic field components of said energy to cancel substantially the effect in said first waveguide of said electric field component of energy coupled through said principal aperture, said subsidiary means comprising a plurality of spaced subsidiary coupling apertures formed in said common wall and interconnecting said waveguides on opposite sides of said diagonal.

2. Directional coupling apparatus as in claim 1 wherein said principal coupling aperture comprises a substantially circular opening.

3. Directional coupling apparatus as in claim 1 wherein said principal aperture comprises a substantially circular opening and said subsidiary coupling apertures comprise a pair of spaced mutually perpendicular slits disposed on opposite sides of said diagonal.

4. Directional coupling apparatus as in claim 3 wherein the combined area of said slits is far less than the area of said circular principal aperture.

5. Directional coupling apparatus as in claim 1 wherein said subsidiary coupling apertures comprise two mutually perpendicular spaced slits centered upon a pair of lines in the plane of said common wall, said lines being disposed parallel to and on opposite sides of said diagonal and being each spaced from said diagonal substantially one quarter wavelength at an operating frequency of said apparatus measured from said diagonal along the longitudinal axes of said first and second waveguides, respectively.

6. Directional coupling apparatus as in claim 1 wherein said subsidiary coupling apertures comprise first and second mutually perpendicular slits parallel to the longitudinal axes of said first and second waveguides respectively, said slits being centered respectively upon first and second lines in the plane of said common wall and disposed parallel to and on opposite sides of said diagonal, said first and second lines being spaced from said diagonal substantially one-quarter wavelength at an operating frequency of said apparatus measured from said diagonal along said longitudinal axes of said second and first waveguides, respectively.

References Cited in the file of this patent

UNITED STATES PATENTS

| | | |
|---|---|---|
| 2,473,274 | Bradley | June 14, 1949 |
| 2,519,734 | Bethe | Aug. 22, 1950 |
| 2,573,746 | Watson | Nov. 6, 1951 |
| 2,602,859 | Moreno | July 8, 1952 |
| 2,723,377 | Cohn | Nov. 8, 1955 |

OTHER REFERENCES

Surdin: "Directive Couplers in Wave Guides," The Journal of I. E. E., vol. 93, Pt. IIIA, No. 4, 1946, pp. 725-36. (Copy in 333-10.)